United States Patent
Fortriede

[11] 3,743,122
[45] July 3, 1973

[54] LAUNDRY SLING BAG AND CART THEREFOR

[75] Inventor: Charles J. Fortriede, Highland Heights, Ky.

[73] Assignee: McGraw-Edison Company, Elgin, Ill.

[22] Filed: July 26, 1971

[21] Appl. No.: 165,989

[52] U.S. Cl. .................. 214/44 R, 150/1, 248/129
[51] Int. Cl. ............................................. B65g 67/24
[58] Field of Search ................... 214/38 CA, 42, 44, 214/59; 280/79.2; 150/1; 248/129

[56] References Cited
UNITED STATES PATENTS
1,478,269  12/1923  Travis ........................... 214/38 CA
3,218,090  11/1965  Herman ........................ 280/79.2 X Primary Examiner—Robert G. Sheridan
Attorney—Charles F. Lind

[57] ABSTRACT

A laundry sling bag and roll about cart therefor, the cart having a front and top open frame with upstanding tabs for holding the bag therein in a top open position for easy loading and for permitting vertically forward power liftoff of the loaded bag from the cart, the bag having two straps to receive the power liftoff conveyor and a cart retaining device being employed to hold the cart down during the power liftoff, the bag being tapered from a large top opening to a smaller but contoured bottom opening and having adjacent bottom flaps formed from one bag half to close the open bottom and overlap with a relieved opposite bag half, whereupon quick release of the flaps is effective to dump the articles of laundry therein without binding or jamming and into a small loading opening in an underlying washer.

In industrial or institutional laundries, it is common to segregate the dirty or soiled articles or goods in sling bags according to the specific types of article or color. For example, different type hospital goods might include uniforms, operating garments, patient garments, bed sheets, etc., where all like goods would be sorted into separate sling bags each of sufficient size to hold maybe 100 pounds of goods. The bags with like goods then can be accumulated and as required dumped into large industrial washers of maybe 400 pound capacity for laundering. By having all like type goods together, the proper washing temperature or washing solution can be used.

7 Claims, 6 Drawing Figures

PATENTED JUL 3 1973

3,743,122

LAUNDRY SLING BAG AND CART THEREFOR

This invention relates to a sling bag construction and to a roll about cart for holding same open.

An object of the invention is to provide a cart and bag arrangement which is separably connected to permit powered vertical disengagement of the bag from the cart, where the bag has two upper straps which can be hooked onto a moving conveyor, and where the cart has a lower cross bar that can be held down by an overlying floor lug to keep the cart in place on the floor during the upward powered bag removal.

Another object of this invention is to provide a tubular bag that has a downwardly converging taper to the bottom tube line, where closure flaps are formed on one bag half to extend well below this tube line and across the open bag bottom and overlap within the other bag half which is relieved or cut away to well above this tube line and be secured in place by a quick release clasp. This provides that goods in the bag are readily discharged from the bottom when opened with little tendency to bind inside the bag, and the bag flaps further fit within the loading opening of typical industrial washers for accurate goods discharge with little spill over onto the floor.

Another object of this invention is to provide a cart that is formed of partially fabricated quick connect flat stock components which when broken down form a compact package for easy shipping and which further can be readily set up by the customer and when set up is nestable with other carts of like construction.

These and other objects of this invention will be more fully understood and appreciated after reviewing the following specification, the accompanying drawing being a part thereof, wherein.

Figure 1:
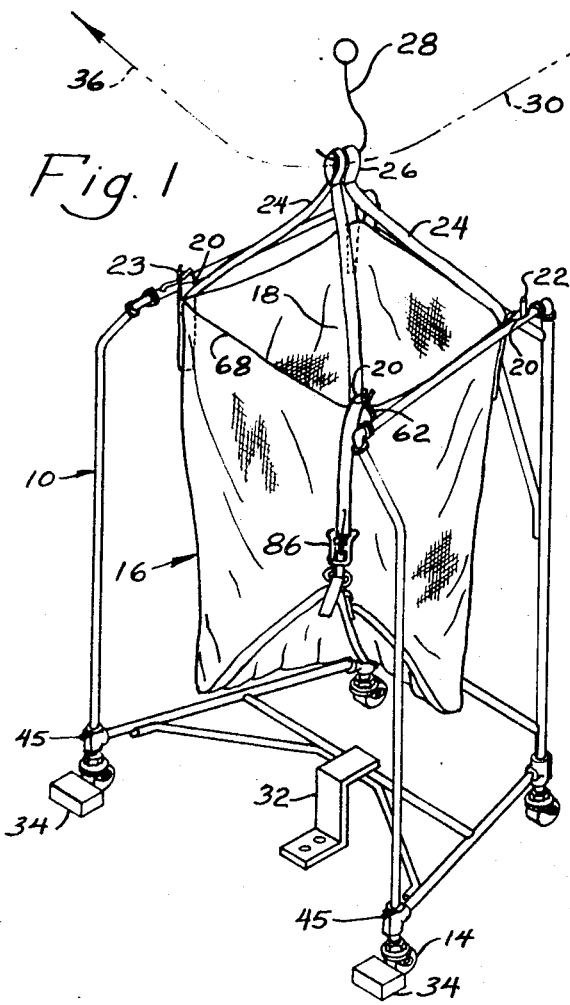
FIG. 1 is a perspective view of the cart with the sling bag shown in phantom supported thereon, and further showing a moving conveyor hook and the cart retaining lug and block in place.

The invention is disclosed in its basic concept in FIG. 1 where a cart 10 having structural frame 12 supported on casters 14 is designed to hold a bag 16 so that the top 18 is open square and can be easily loaded. To accomodate this, the bag 16 has rings or eyelets 20 which fit over four upstanding tabs 22 and 23 on the frame at the corners of the bag. The bag has two straps 24 each having a loop or eyelet 26 formed at the center thereof so that a hook 28 of an overhead conveyor 30 can be brought into registry over the bag and cart combination to allow the strap eyelets 26 to be engaged on the conveyor hook 28. Moreover, a tongue 32 is adapted to overlie the frame 12 to hold the cart 10 against the supporting floor and blocks 34 can also be located in front of the casters so that the conveyor can move vertically and forwardly relative to the cart to lift the bag from the frame tabs 22 and 23 with the cart moving. To accomodate the bag removal, the frame 12 has an open front and top, as it is noted in FIGS. 1, 2 and 3.

In a broad context, this invention would be most aptly applied for soiled goods before laundering where at a sorting table or the like an operator can selectively sort the soiled laundry into selective bags each supported on a cart. The bag size is designed when loaded to hold a given poundage of laundry, for example 100 pounds, so that by operator experience and with little extra manipulation the proper bag weight can be approximated. An industrial washer having, for example, a 400 pound capacity could be loaded then with four filled bags.

Thus, the operator would deposit selected articles of laundry into the open top 18 of a bag 16 supported on the cart 10. When the appropriate bag load has been achieved, the cart would be wheeled from the sorting area over to a bag power takeoff area under a conveyor 30. The cart 10 here is locked in place by means of the tongue 32 and the blocks 34 relative to the floor, and the conveyor hook 28 is brought into registry over the bag where the two opposing bag straps 24 are engaged onto the hook. Eyelets 26 prevent shifting of the bag relative to the hook. After hooking the bag onto the conveyor hook, the operator merely actuates the conveyor to cause it to move in an upward and forward direction (as indicated at 36 in FIG. 1) relative to the secured cart so that the bag eyelets 20 lift off the cart tabs 22 and 23 and is then solely suspended on the conveyor.

Referring now to some specific structural details, initially note that the cart frame 12 is formed of fabricated components which fit in a flat package for easy shipment to a customer and which can be readily assembled by the customer to the actual cart. The cart frame 12 has a base 40 including forwardly diverging side elements 41 and a cross element 42 connecting same as well as reinforcing struts 43. The ends of each side element 41 have sleeves 44 each having a through opening therein in general vertical alignment and a set screw 45 opens to the sleeve opening. The frame back 48 has a pair of vertical legs 49 connected together by a pair of cross elements 50 and reinforcing struts 51 connect the upper cross element and the legs. Each leg bottom is threaded at 52 and each leg top has thereon a fitting 53 with a threaded tap forwardly open and generally normal to the vertical leg 49. Front support legs 55 each has a threaded bottom 56 and a threaded top 57, and the top side bars 59 each has a threaded rear end 60 and a right angle front fitting 61 with a bottom open threaded tap. The tabs 22 and 23 are on the top side bars 59, the rear tab 22 being merely a short vertically upstanding finger and the front tab 23 having a Y configuration supported on an upwardly and inwardly inclined arm 62. The casters 14 have a threaded top opening 65.

By fitting the thread 60 on the top side pipe 59 into the top fitting 53 on the rear frame and likewise by threading the upper thread 57 into the forward threaded fitting 61 of the side bar 59, a box like structure is obtained with the assembled rear frame 48, the top side elements 59 and the front legs 55. As thus assembled, the lower ends of the rear frame 48 and front legs 59 are fitted through the corresponding openings on the base fitting 44 and the caster taps 65 are secured to the threaded ends 52 and 56. The set screws 45 are set in place, preferably through an aligned opening in one wall of the tubular leg to locate the base 40 relative to the legs.

Figure 2:
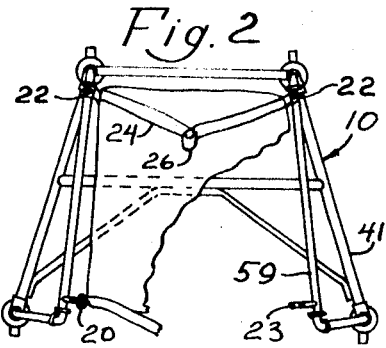
FIG. 2 is a top plan view of the cart and bag combination shown in FIG. 1, with part of the structure being broken away for clarity of disclosure.
Figure 3:
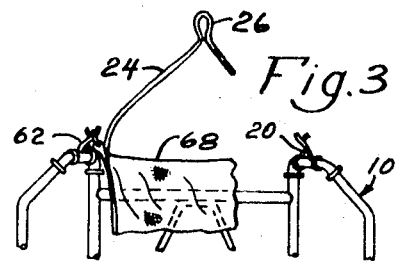
FIG. 3 is a front elevational view of part of the cart and the bag combination of FIG. 1, again with part of the structure being broken away.
Figure 5:
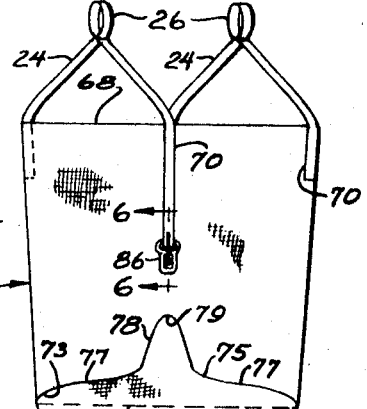
FIG. 5 is a plan view of the bag shown in FIGS. 1 – 3, except as it is lying on a flat surface and in the open condition.
Figure 4:
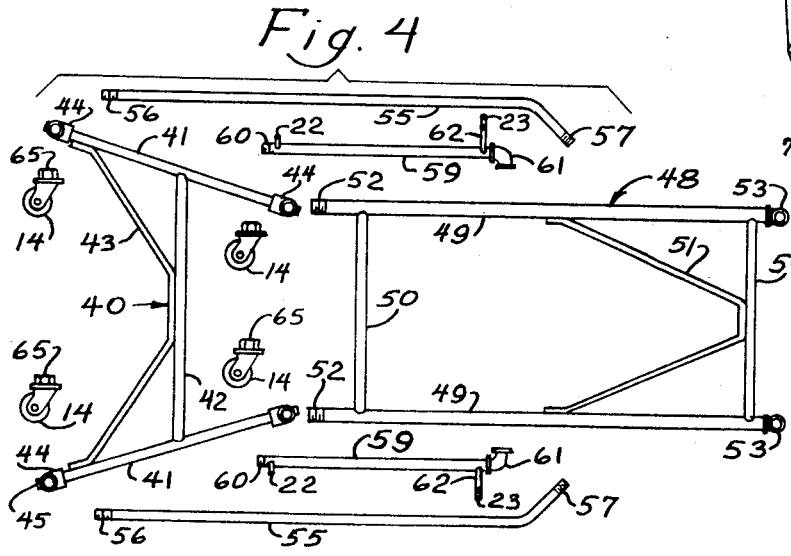
FIG. 4 is a plan view of the dismantled fabricated components that form the cart shown in FIGS. 1 – 3.

Not only can the frame be set up by a user on location, but the assembled cart is readily nestable with others of like type for compact storing. The forwardly diverging top side elements 59 (as seen in FIG. 2) and the diverging base side elements 41 allow this. The Y tabs 23 are elevated above the rear tab 22 so that they clear one another during this cart nesting. The cart frame can most economically be made of tubular steel pipe or tubing and accordingly the threaded sections can be typical pipe threads. The fittings in turn can be typical pipe fittings or elbows and the entire cart can be set up merely with a pipe wrench by a person having no mechanical expertise.

In like manner, the bag 16 is formed from a canvas or nylon material as basically a tubular configuration. The upper tube and hem line 68 are exactly the same, and the eyelets 20 are secured at this line approximately by webs or the like sewn to the bag as might be typical in the art. The two straps 22 are likewise secured at adjacent bag corners adjacent the eyelets, and the strap material preferably would extend along part of the bag corner as reinforcing vertical strips 70 sewn to the tube. As noted, the straps preferably have a centered eyelet 26 therein as by sewing adjacent parts of the strap together, which permits the use of only two straps on a single conveyor overhead conveyor hook while yet stabily supporting the bag in the vertical orientation.

Although the bag material is basically tubular in nature it does have a taper from its upper tube and hem line 68 to a slightly narrower tube line 72. This taper might be equivalent to where, for example, a 100 inch perimeter exists at top line 68 and at 85 inch perimeter exists at bottom line 72 and where the separation of these lines or tube height might be 50 inches. This decreasing taper towards the bottom of the bag permits a wide opening for loading at the top and a narrower discharge chute like opening at the bottom which would more readily fit into or relative to the loading opening of an industrial washer. The bag can be easily dumped with little tendency of binding or jaming of the goods therein because of the specific closure flaps to be disclosed now.

The actual bottom or hem line 74 of the bag or tube is irregular, with approximately one circumferential half 75 being above or shorter than lower tube line 72 and the opposite approximate circumferential half 76 being below or longer than this tube line. As noted, the four bag corners above strips 70 are supported in a generally square open configuration by the four cart tabs, and each panel below and between these strips is approximately one fourth of the tube perimeter.

The shorter or relieved circumferential tube half 75 hem line converges upwardly as at 73 from the lower tube line 72 until approximately one-third of the way across the quarter panel, it then parallels the tube line as at 77 for approximately another one-third way across the quarter panel, and lastly converges upwardly as at 78 to meet with the adjacent quarter panel hem line at a rounded cutout or slit 79 generally across one bag corner. The total height of the cutout 79 above the tube line 72 might be, for example, a full panel width or one-fourth of the tube perimeter at the lower tube line 72.

The longer or extended circumferential tube half converges downwardly away from the tube line 72 as at 81 to a rounded corner 82 approximately one-half way across the quarter panel and then reverses itself to converge upwardly as at 83 to again meet the adjacent quarter panel hem line at a rounded corner 84 generally across the diagnally opposite bag corner. The longer circumferential bag half is used as two closure flaps which are adapted to cross and close the bottom opening of the tube and to overlap the opposite lower portion of the relieved circumferential tube half. The distance, for example, thereby between the rounded corner 82 of each flap and the generally parallel relief area 77 on the adjacent panel is approximately the width of two quarter panels at the lower tube line 72.

Figure 6:
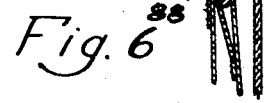
FIG. 6 is a sectional view taken generally from line 6 — 6 in FIG. 5, except with the bag in the closed condition.

To secure the closure flaps in the bag closed position there is provided a quick release device shown in FIG. 6. In this arrangement, a bracket 86 is secured to the lower end of one reinforcing strip 70 approximately one panel width above the lower tube line edge 79 and this bracket 86 has an opening 87 which opens downwardly towart the bag bottom. One rounded flap corner has a buckle 88 while the adjacent rounded flap corner has a stem 89 with an end opening 90. The stem 89 is fitted through the buckle 88 to secure the flaps together and the stem 89 is then fitted through the bracket opening 87 to locate the lapped flaps across to thereby close the bag tube. A catch 92 pivoted at 93 from the bracket 86 has a protruding end 94 that fits through the stem opening 90 to preclude separation of the stem from the bracket. A rope or line 95 attached to the catch 92 is used for manually shifting the catch to release the flaps when such is required.

When the bag is closed and the goods are loaded into the bag, they are supported on the crossed closure flaps. Consequently, when the crossed flaps are released, the unsupported load drops vertically and can also shift horizontally toward the unfolding relieved tube half. This capacity for the load to shift horizontally allows easy dumping without jamming. The downwardly converging tapered bag walls provide a large top opening for easy loading while yet give a small enough bottom opening to fit within the opening of the washer. This minimizes any spilling out of the load onto the floor. The uncurled flaps on one tube half further tend to guide the released load into the washer opening.

What is claimed is:

1. A sling bag and roll about cart combination, comprising said cart having an open top and an open front and having a base with rollers thereon and having front and rear pairs of vertical support legs connected to the base and extending upwardly therefrom and side and rear elements connected to the legs near the upper ends thereof, four upstanding tabs formed respectively near the front and rear ends of the side elements and defining a generally square configuration as seen in plan, said bag being tubular and fitting with clearance inside the vertical legs and upper end elements connected thereto, four eyelet rings secured to the tubular bag adjacent the top thereof for support of the bag on the cart tabs, straps connected to the bag adjacent the rings thereon and each having a loop, a power hook adapted to be brought in registry over the bag and cart whereby the strap loops can be engaged on the power hook, means holding the cart down and stationary relative to the power hook whereby the power hook can move in the direction upwardly and forwardly of the cart to lift the bag from the tabs, the tubular bag having an open bottom and having flaps that can be disposed thereacross for closing the bottom, and a quick release device for releasably holding the flaps closed.

2. The cart and bag combination according to claim 1, wherein said side elements diverges forwardly from the rear legs to the front legs at the open front end of the cart, and wherein the vertical front legs are bowed.

3. The cart and bag combination, according to claim 2, wherein the front end tabs are located at an elevation higher than the rear end tabs, and each front end tab being supported on an upwardly and inwardly inclined arm from the side element.

4. The bag and car combination according to claim 1, wherein the lower edge of the tubular bag has an irregular hem line where approximately half of the hem line is shorter than or above what would be the normal lower tube line and where the approximate other half of the hem line is longer than or below the lower tube line, and where the closure flaps are defined on the longer hem line side and are designed when the flaps are closed to be secured relative to the bag at the shorter hem line side.

5. The bag and cart combination according to claim 4, wherein the shorter hem line side of the bag extends above the lower tube line a distance approximately equal to one-fourth of the lower tube line perimeter, and the longer hem line side of the bag extends below the lower tube line a distance approximately equal to one-fourth of the lower tube line perimeter.

6. The bag and cart combination according to claim 4, wherein the tubular bag configuration tapers in a downwardly converging manner from the upper tube line to the lower tube line at a rate of approximately one-fourth inch smaller perimeter for every one inch of axial separation of upper and lower tube lines.

7. The bag and cart combination according to claim 1, wherein the cart is formed of fabricated frame components each easily assembled together to the cart configuration, including the base having opposed side bars and a cross bar connecting said side bars and sleeve fittings formed at the opposite ends of the side bars, a rear structure having said rear vertical support legs and rear element connected thereto, the separate vertical front support legs and the separate side elements, and the separate rollers, where the upper end of each rear support leg and the rear end of the adjacent side element are threaded together across a right angle elbow, where the upper end of each front support leg and the front end of the adjacent side element are threaded together across a right angle elbow, where the lower end of each vertical leg can be fitted into the respective sleeve fittings and secured thereto, and where the rollers are threaded to the frame components under the respective vertical leg.

* * * * *